Figure 1:
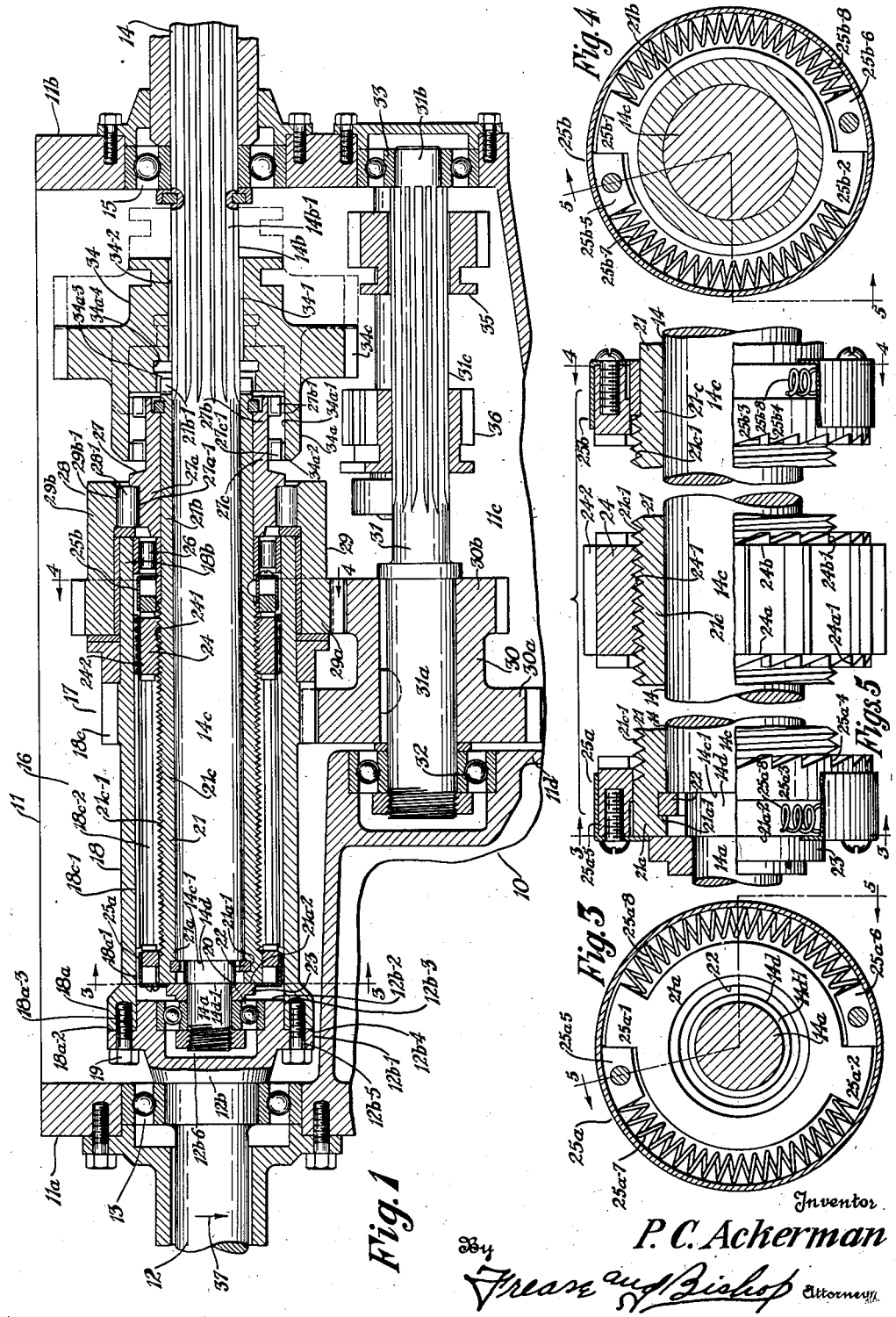

Aug. 7, 1934.  P. C. ACKERMAN  1,969,289

AUTOMATIC SPEED CHANGE POWER TRANSMISSION APPARATUS

Filed May 13, 1932  2 Sheets-Sheet 1

Inventor
P. C. Ackerman
By Frease and Bishop, Attorneys

Patented Aug. 7, 1934

1,969,289

UNITED STATES PATENT OFFICE 1,969,289

AUTOMATIC SPEED CHANGE POWER TRANSMISSION APPARATUS

Paul C. Ackerman, Canton, Ohio

Application May 13, 1932, Serial No. 611,111

14 Claims. (Cl. 74—59)

My invention relates to power transmission apparatus including one rotary member which may be a drive shaft, a second rotary member which may be a driven shaft, and a change-speed mechanism operatively interposed between the members, whereby the ratio between the speeds of the rotary members may be changed to one of a plurality of different ratios.

Most change-speed mechanisms in common use are arranged for manual operation for changing the ratio between the speeds of the rotary members or shafts; but particularly in the case of the change-speed mechanism of the transmission of an automobile, it is desirable that some if not all of the speed changes be effected automatically in order to relieve the strain of driving in congested city traffic.

The present invention is accordingly particularly intended for automotive use, but is applicable to any machinery including two shafts, and in which it is desirable to automatically change the ratio between the rotary speeds of the shafts.

Accordingly, the objects of the present invention include the provision of automatic speed change power transmission apparatus which is particularly adapted for use in an automobile, and which when used in an automobile, permits normal operation of the usual gear shift lever for selectively changing the gear set for example of a three forward speed and reverse transmission, to low speed, second speed, or high speed forward, or to reverse, and in which after the gear set has been manually shifted to high speed forward, the improved transmission will be automatically actuated to change between high speed forward and second speed forward as required under the usual conditions of driving.

Further objects of the present invention include the provision of novel power transmission apparatus including two rotary members or shafts, and an improved mechanism operatively interposed between the shafts for automatically providing one or two different ratios between the speeds of the shafts, the particular ratio depending upon the relative speeds of the shafts, and the change in ratios being effected during a predetermined number of revolutions of one of the shafts with respect to the other.

Further objects of the present invention include the provision of automatic speed change power transmission apparatus of the foregoing description, and which includes a novel, simplified, and compact construction and arrangement of the parts thereof, whereby the improved apparatus may be readily incorporated in an automobile of otherwise usual construction.

The foregoing and other objects are attained by the improvements, apparatus, parts, combinations, and sub-combinations, which comprise the present invention, and the nature of which is set forth in the following general statement, and preferred embodiments of which, together with their mode of use, are set forth in the following description, and which are particularly and distinctly pointed out and set forth in the appended claims forming part hereof.

The nature of the improved apparatus of the present invention may be described in general terms as including two rotary members, preferably co-axial with each other, and operatively connected with each other by an improved automatic change-speed mechanism whereby the ratio between the speeds of the rotary members is automatically changed from one to another of two ratios, depending upon the relative speeds of the members, and whereby the maximum period of driving connection between the rotary members in one of the ratios may be fixed at a definite number of revolutions of one of the rotary members with respect to the other rotary member.

The improved automatic change-speed mechanism preferably includes two sets of drive means, each of which is operatively interposed between the rotary members.

One set of drive means preferably includes a drive member arranged for intermittently providing a driving engagement between the rotary members, preferably by being mounted for engaged rotation with and longitudinal movement with respect to one of the rotary members, and for rotation and longitudinal movement with respect to the other rotary member, whenever the speeds of the rotary members are different from each other, the longitudinal travel of the drive member being limited and driving engaging means being provided by longitudinally spaced and preferably rotatably yielding stop members on or connected with one of the rotary members, preferably on the rotary member with respect to which the drive member is rotatable and longitudinally movable.

The other set of drive means preferably comprises one direction drive means such as an overrunning clutch and speed change means such as a reduction gearing operatively interposed between the rotary members.

Figure 2:
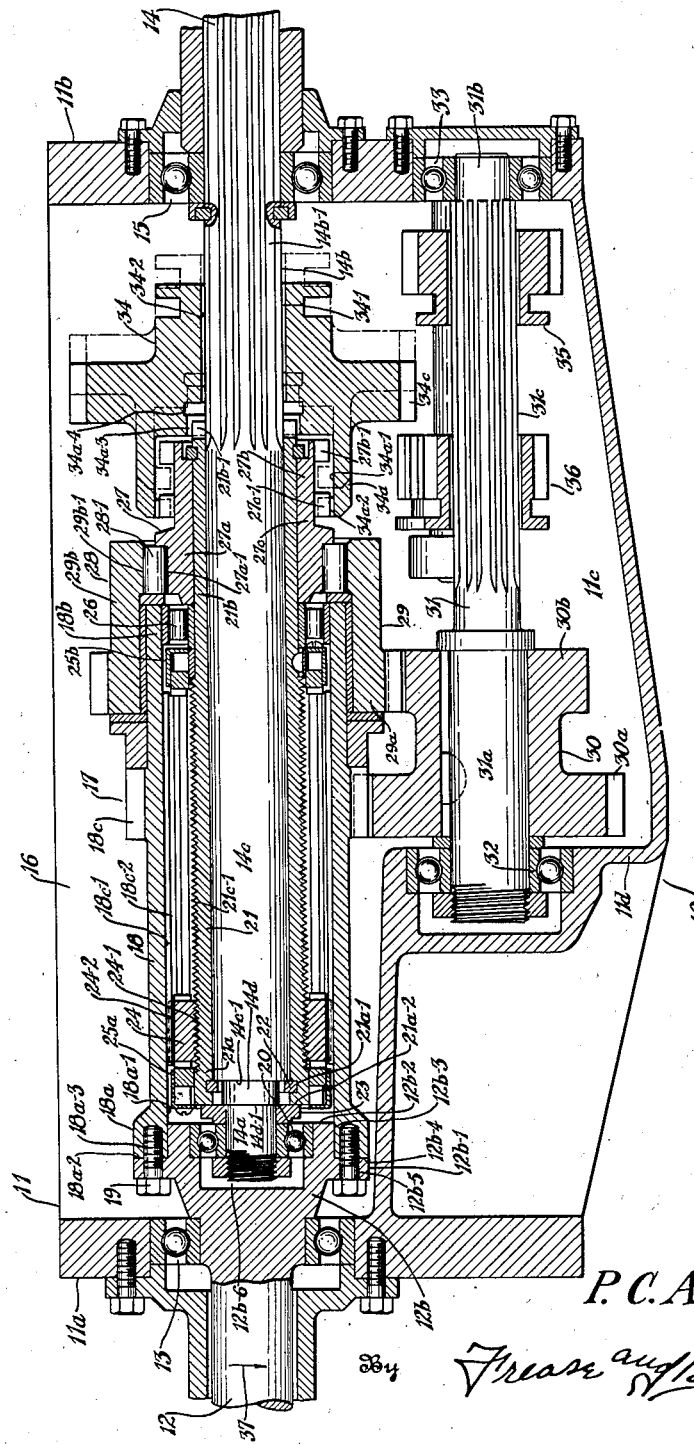

Preferred embodiments of the improved apparatus and parts thereof are illustrated in the accompanying drawings forming part hereof, in which Figure 1 is a fragmentary longitudinal sectional view of a three speed forward and reverse transmission apparatus of an automobile, the apparatus including the present improvements, and the parts of the apparatus being shown in full lines in their relative positions for high speed and automatic second speed operation, and the primary manually shifted part of the apparatus being shown in broken lines in its position relative to the other parts for normal second speed operation of the apparatus;

Fig. 2, a similar view with the parts being shown in full lines at the start of the maximum automatic second speed operation attainable by operation of the apparatus, and the primary manually shifted part being shown in broken lines in its neutral position relative to the other parts;

Fig. 3, an enlarged transverse sectional view thereof as on line 3—3 in Fig. 1 and on line 3—3 in Fig. 5, with distant parts removed;

Fig. 4, a similar view as on line 4—4, Fig. 1 and on line 4—4, Fig. 5; and

Fig. 5, enlarged fragmentary views of the apparatus, as on lines 5—5, Figs. 3 and 4, with distant parts removed.

Similar numerals refer to similar parts throughout the several views.

An automobile transmission apparatus including the present improvements, is indicated generally by 10, and includes a transmission case 11 having longitudinally spaced laterally extending walls 11a and 11b which are connected by laterally spaced longitudinally extending walls 11c only one of which is shown in the drawings.

The transmission apparatus 10 is installed in a usual manner in an automobile, not shown, and the wall 11a is the front wall of the case, and the wall 11b is the rear wall thereof.

One rotary member or driving shaft 12 extends through and is journalled in a suitable opening formed in the front wall 11a, the journalling therein being preferably effected by means of an anti-friction bearing 13.

Beyond the outer face of the wall 11a, the shaft 12 is operatively connected in a usual manner with the power take-off side of any usual automobile clutch, not shown.

A second rotary member or driven shaft 14 extends through and is journalled in a suitable opening formed in the rear wall 11b, the journalling therein being preferably effected by means of an anti-friction bearing 15.

Beyond the outer face of the wall 11b the shaft 14 is operatively connected in a usual manner, as through a universal joint, not shown, and differential, not shown, with the rear wheels of the automobile, not shown.

The shafts 12 and 14 are preferably co-axial with each other, and are operatively connected with each other inside the chamber 16 of the case 11, by an improved automatic change-speed mechanism indicated generally by 17, whereby the ratio between the speeds of the shaft 12 and the shaft 14 is automatically changed from one to another of two ratios, depending upon the relative speeds of the shafts and whereby the maximum period of driving connection between the shafts in one of the ratios may be fixed at a definite number of revolutions of one of the shafts, with respect to the other.

The improved automatic change-speed mechanism 17 includes an outer longitudinally extending tubular member or shaft 18, which is co-axial with the shafts 12 and 14, and the front end 18a of the tubular shaft 18 is preferably separably connected with the rear end 12b of the drive shaft 12.

For this purpose, as illustrated, the rear end 12b of the shaft 12 has formed thereon an outwardly extending flange 12b—1, which is spaced forwardly of the rear end face 12b—2 of the shaft 12, and a cylindric pilot surface 12b—3 extends between the shaft rear end face 12b—2 and the flange rear end face 12b—4.

The front end portion 18a—1 of the bore of the tubular shaft 18 fits over the cylindric pilot surface 12b—3 of the drive shaft rear end 12b, and the front end face 18a—2 of the tubular shaft 18 abuts against the rear end face 12b—4 of the rear end flange 12b—1 of the drive shaft 12, and the flange 12b—1 is provided with a plurality of apertures 12b—5 each registering with a threaded bore 18a—3 formed in the front end 18a of the tubular shaft 18, and the threaded shank of a cap screw 19 is passed through each flange aperture 12b—5 and screwed into the tubular shaft end bore 18a—3 registered therewith, with the head of each cap screw clamping the flange 12b—1 against the tubular shaft end 18a.

Within the chamber 16, the shaft 14 extends from the wall 11b into and through the bore of the tubular shaft 18, and the shaft 14 terminates in a front end 14a of reduced diameter, which is journalled in a counterbore 12b—6 formed in the rear end 12b of the shaft 12.

The journalling of the front end 14a of the shaft 14 in the rear end 12b of the shaft 12 is preferably effected as by means of an anti-friction bearing 20.

An inner longitudinally extending tubular member or sleeve 21 is rotatably mounted on the central portion 14c of the shaft 14, and the front end 21a of the sleeve 21 is preferably located adjacent the bearing 20, and the sleeve 21 is secured against movement longitudinally of the shaft 14, as by means of a split resilient ring 22 which is seated in an inwardly opening annular groove 21a—1 formed in the bore at the front end 21a of the sleeve, and the ring 22 abuts against a front shoulder 14c—1 extending between the front end of the shaft portion 14c and an intermediate reduced portion 14d of the shaft located between the central portion 14c and the front end 14a; and a spacing and retaining collar 23 is interposed between the bearing 20 and a shoulder 14d—1 extending between the front end of the shaft portion 14d and the rear end of the shaft portion 14a, and the collar 23 provides a thrust abutment for the front end face 21a—2 of the front end 21a of the inner sleeve 21.

An automatically and intermittently actuated drive member 24 is operatively interposed between the outer tubular shaft 18 and the inner sleeve 21 for intermittently providing a driving engagement between the shaft and the sleeve.

The drive member 24 is preferably as illustrated in the form of a ring nut having a central bore provided with internal threads 24—1, and having an outer cylindric surface provided with circumferentially spaced longitudinally and outwardly extending drive splines 24—2.

External threads 21c—1 are formed upon the outer surface of the central portion 21c of the sleeve 21, and the internal threads 24—1 of the ring nut 24 are screwed on the external threads 21c—1 of the inner sleeve 21.

The bore 18c—1 of the central portion 18c of the tubular shaft 18 has formed therein a plurality of circumferentially spaced longitudinally and inwardly extending splines 18c—2 which slidably fit between the longitudinally and outwardly extending splines 24—2 of the ring nut 24.

The ring nut 24 is thus operatively mounted for engaged rotation with and longitudinal movement with respect to the tubular shaft 18, and for simultaneous rotation and longitudinal movement with respect to the sleeve 21, whenever there is any relative rotary movement between the tubular shaft 18 and the sleeve 21.

The longitudinal movement or travel of the ring nut 24 towards the front of the apparatus is limited by preferably rotatably yielding stop collar means indicated generally by 25a which are operatively mounted on the front end 21a of the inner sleeve 21 beyond the front end of the sleeve threads 21c—1 and the front end of the tubular shaft splines 18c—2.

The longitudinal movement or travel of the ring nut 24 towards the rear end of the apparatus is limited and a driving engagement is provided by preferably rotatably yielding stop collar means indicated generally by 25b which are operatively secured on the rear end 21b of the sleeve 21 beyond but immediately adjacent the rear end of the sleeve threads 21c—1 and the rear end of the tubular shaft splines 18c—2.

The rear end 18b of the tubular shaft 18 extends rearwardly beyond the stop collar means 25b, and an anti-friction bearing 26 is preferably interposed between the tubular shaft rear end 18b and the sleeve rear end 21b.

The sleeve rear end 21b extends on the shaft portion 14c beyond the tubular shaft rear end 18b and the bearing 26.

From one standpoint, the sleeve 21 may be considered to be one member which is intermittently operatively connected with the shaft 12 through the stop collar means 25b, the drive nut member 24, and the tubular shaft member 18; and the ratio of the speeds of the shaft 12 and the sleeve 21, when operatively connected with each other as aforesaid, is unit.

Another member 27 is provided in association with the shaft 12 for being driven thereby so that the ratio between the speeds of the shaft 12 and the member 27 is different than the ratio between the speeds of the shaft 12 and the sleeve 21.

As illustrated, the member 27 is preferably in the form of a clutch sleeve which is journalled on the outer end 21b of the sleeve 21 beyond the anti-friction bearing 26.

The front end 27a of the clutch sleeve 27 comprises the inner raceway member of a one direction drive means, preferably an overrunning clutch indicated generally by 28, and which includes an outer raceway member 29b comprising the rear end of an intermediate drive sleeve 29.

The inner raceway member 27a of the overrunning clutch 28 has an outer raceway surface 27a—1 formed thereon, and the outer raceway member 29b has an inner raceway surface 29b—1 formed therein, and roller engaging members 28—1 are interposed between the raceway surfaces, and the raceway surfaces are formed in any usual manner, so that a driving engagement is provided in one direction between the sleeve 29 and the sleeve 27, excepting when the sleeve 27 is otherwise rotated faster than the sleeve 29.

The intermediate drive sleeve 29 is journalled on the rear end 18b of the tubular shaft 18, and the front end 29a of the sleeve 29, comprises a gear wheel which is meshed with a pinion 30b comprising the rear end of a countershaft sleeve 30, which as illustrated is secured on the front end 31a of a countershaft 31, and the countershaft 31 is journalled in the case 11.

The journalling of the countershaft 31 is preferably effected by means of an anti-friction bearing 32 interposed between the extremity of the front end 31a of the countershaft and a suitable counterbore formed in an intermediate laterally extending wall 11d of the case 11; and an anti-friction bearing 33 is interposed between the extremity of the rear end 31b and a suitable bore formed in the case rear wall 11b.

The front end 30a of the countershaft sleeve 30 comprises a gear wheel which is meshed with a gear pinion 18c comprising a central portion of the tubular shaft 18.

In other words, the gears 29a, 30b, 30a, and 18c comprise a reduction gearing or speed change means connecting the intermediate drive sleeve 29 with the tubular shaft 18 and thus with the shaft 12, whereby the sleeve 29 is always rotating at a speed less than that of the shaft 12; and accordingly the clutch sleeve 27 will be driven by and at the speed of the sleeve 29, excepting when the clutch sleeve 27 is otherwise driven at a greater speed than that of the sleeve 29.

For automotive use, the clutch sleeve 27 is arranged for selective independent driving connection with the shaft 14, and for selective driving connection with the shaft 14 when the same is also in driving connection with the sleeve 21.

This selective driving connection between the shaft 14 and the sleeve 27 only, and between the shaft 14 and the sleeve 27 and the sleeve 21, is effected as illustrated, as by means of a clutch and gear sleeve 34 which is operatively mounted for engaged rotation with and longitudinal sliding on the rear end 14b of the shaft 14 within the chamber 16 and beyond the rear ends of the sleeves 21 and 27, as by means of circumferentially spaced longitudinally extending splines 14b—1 on the shaft rear end 14b, which splines 14b—1 slidably interfit with circumferentially spaced longitudinally extending splines 34—1 formed in the bore 34—2 of the sleeve 34.

The front end 34a of the sleeve 34 has formed therein a counterbore 34a—1, and at the front end of the counterbore 34a—1 a set of circumferentially spaced clutch teeth 34a—2 extends inwardly for selective engagement with a set of circumferentially spaced clutch teeth 27c—1 formed on and extending outwardly from the central portion 27c of the sleeve 27.

At the rear end 27b of the sleeve 27, another set of circumferentially spaced clutch teeth 27b—1 is formed for selective engagement with the sleeve teeth 34a—2.

A set of clutch teeth 21b—1 is formed on the rear end face of the sleeve 21 for engagement with a set of clutch teeth 34a—3 formed in an extension counterbore 34a—4 of the counterbore 34a—1.

The relative locations of the sets of clutch teeth 27c—1, 27b—1, 34a—2, and 34a—3, are such, that when the sleeve 34 is in the position illustrated in full lines in Fig. 1, the sleeve 34 is in simultaneous engagement with the sleeve 27 and the sleeve 21, and the parts are in their relative positions for high speed and automatic second speed operation.

For manually shifted second speed operation, the sleeve 34 is shifted to the position illustrated in broken lines in Fig. 1.

For manually shifted reverse or low speed operation, the sleeve 34 is shifted to the neutral position with respect to the sleeves 21 and 34 indicated in broken lines in Fig. 2.

The countershaft 31a is splined in its central portion 31c, and a low speed intermediate gear 35 is spline mounted on the central countershaft portion 31c, and a reverse gear set indicated generally by 36 is similarly spline mounted on the countershaft portion 31c, so that either the low speed gear 35 or the reverse gear set 36 may be meshed with a gear wheel 34c formed on the sleeve 34 when the sleeve 34 is in the neutral position indicated in broken lines in Fig. 2.

As best illustrated in Figs. 3 to 5 inclusive, for providing the preferred shock absorbing engagement between the drive nut 24 and the stop collar means 25a or 25b, the end face of the front end 24a of the drive collar 24 has formed thereon a set of ratchet teeth 24a—1, and the end face of the rear end 24b of the drive nut has formed thereon a set of ratchet teeth 24b—1.

The teeth 24a—1 and the teeth 24b—1 are arranged for ratcheting in opposite directions of rotation of the nut 24.

For the usual rotation of the shaft 12 in the direction of the arrow 37, and when the threads 21c—1 are right hand, the ratchet teeth 24b—1 are arranged to ratchet when the nut 24 is rotated in the direction reverse to the direction of the arrow 37, and to engage when rotated in the direction of the arrow 37; and the ratchet teeth 24a—1 are reversely arranged.

The rotatably yielding stop collar means 25a as illustrated comprises opposite radially extending arms 25a—1 and 25a—2 secured to and extending outwardly from the front end 21a of the sleeve 21.

A ratchet ring 25a—3 is rotatably mounted on the front end 21a of the sleeve 21 rearwardly of the arms 25a—1 and 25a—2, and the ratchet ring 25a—3 has formed on its rear face a set of ratchet teeth 25a—4 which are arranged for ratcheting with the teeth 24a—1 or for engaging the teeth 24a—1 depending upon the direction of rotation of the nut 24 with respect to the sleeve 21.

From the front face of the ratchet ring 25a—3 radially opposite arms 25a—5 and 25a—6 extend forwardly alongside of the arms 25a—1 and 25a—2, respectively.

A shock absorbing compression spring 25a—7 is interposed between the arm 25a—5 and the arm 25a—2; and similarly a shock absorbing compression spring 25a—8 is interposed between the arm 25a—6 and the arm 25a—1.

The stop and drive engaging collar means 25b as illustrated comprises opposite radially extending arms 25b—1 and 25b—2 secured to and extending outwardly from the sleeve 21.

A ratchet ring 25b—3 is rotatably mounted on the sleeve 21 forwardly of the arms 25b—1 and 25b—2, and the ratchet ring 25b—3 has formed on its front face a set of ratchet teeth 25b—4 which are arranged for ratcheting with the teeth 24b—1 or for engaging the teeth 24b—1 depending upon the direction of rotation of the nut 24 with respect to the sleeve 21.

From the rear face of the ratchet ring 25b—3 radially opposite arms 25b—5 and 25b—6 extend rearwardly alongside of the arms 25b—1 and 25b—2, respectively.

A shock absorbing compression spring 25b—7 is interposed between the arm 25b—5 and the arm 25b—2; and similarly a shock absorbing compression spring 25b—8 is interposed between the arm 25b—6 and the arm 25b—1.

In operation of the improved apparatus 10, when the parts are in the relative positions illustrated in full lines in Fig. 1, the drive shaft 12 is in direct or high speed driving connection with the driven shaft 14, through the tubular shaft 18, the drive nut 24, the stop and engaging means 25b, the sleeve 21, and the sleeve 34.

As aforesaid the sleeve 34 is in simultaneous engagement with the sleeve 27.

Accordingly when the speed of the drive shaft 12 is retarded, as for example by disengagement of the clutch of the automobile, upon approaching a stop light, the sleeve 21 continues to be driven through the rear wheels of the automobile for a certain number of revolutions of the shaft 14, at substantially the same speed as it was being driven by the shaft 12 prior to the disengagement of the clutch.

In other words after disengagement of the clutch, the shaft 14 and sleeve 21 rotate faster than the shaft 12 and the tubular shaft 18, and accordingly the drive nut 24 will disengage from the stop means 25b and will advance forwardly towards the stop means 25a.

If the clutch has been disengaged at a distance sufficiently remote from the stop light, the drive nut 24 thus advancing towards the stop means 25a will ultimately engage the same, and the parts of the apparatus will then be in the relative positions illustrated in full lines in Fig. 2, ready for automatic second speed operation whenever the clutch is engaged and the engine is accelerated.

The automatic second speed driving connection between the shaft 12 and the shaft 14 is effected through the gears 18c, 30a, 30b, and 29a, and the overrunning clutch 28 the parts of which are in driving engagement with each other, upon engagement of the clutch and acceleration of the engine, when the automobile has been stopped as aforesaid.

The tubular shaft 18 then runs faster than the shaft 14 and the drive nut 24 will travel rearwardly towards the stop and drive means 25b, and with continuous acceleration of the engine, will ultimately engage the stop and drive means 25b, and the parts of the apparatus will then be again automatically connected in their relative positions illustrated in Fig. 1, with direct or high speed drive between the shaft 12 and the shaft 14.

Assuming for example that the gearing connection between the sleeve 29 and the tubular shaft 18 is such that the sleeve 29 is always driven at one-half of the speed of the tubular shaft 18, then at all times when the drive nut 24 is disengaged from either of the stop means 25a or 25b, and when the speed of the shaft 14 and thus of the sleeve 34 and the sleeve 27 is greater than one-half of the speed of the tubular shaft 18, the sleeve 27 is running at a greater speed than the sleeve 29, and accordingly the shaft 14 is free wheeling or overrunning with respect to the shaft 12.

When such free wheeling occurs, the drive nut 24 may be moved in either direction, depending upon the relative speeds of the shafts 12 and 14.

In other words, at all times when the shaft 14 is rotating faster than the shaft 12, the drive nut 24 will be advancing towards the stop means 25a.

When however the speed of the shaft 12 is greater than the speed of the shaft 14, but not equal to twice the speed of the shaft 14, the drive nut 24 will be travelling rearwardly towards the stop means 25b.

Whenever the drive nut 24 engages the stop means 25b high speed or direct drive results as aforesaid; and whenever the drive nut 24 engages the stop means 25a, the speed of the shaft 12 and the tubular shaft 18 has necessarily become twice the speed of the shaft 14, and an automatic second speed driving connection as aforesaid will be effected from the shaft 12 to the shaft 14 through the gears 18c, 30a, 30b, 29a, and the overrunning clutch 28, the parts of which are then in driving engagement with each other.

Likewise, whenever the drive nut 24 is not in engagement with either the stop means 25a or 25b, but the speed of the tubular shaft 18 is brought up to twice the speed of the shaft 14 by acceleration of the engine, automatic second speed drive is also effected between the shaft 12 and the shaft 14 through the reduction gearing or speed change means and the one direction drive or overrunning clutch means.

Accordingly a very flexible automatic speed changing apparatus is provided, which is characterized by the fact that the maximum period of possible automatic second speed drive is determined by a definite number of revolutions of the shaft 12 when in automatic second speed drive in excess of the number of revolutions of the shaft 14, during the same period of time.

The pitch of the threads 21c—1 determines this fixed maximum number of relative revolutions of the shafts 12 and 14 during which automatic second speed drive may be effected.

Accordingly the maximum travel of the automobile during automatic second speed may be predetermined.

By the provision of the rotatably yielding stop and engaging means 25a and 25b, the springs will absorb the shock of engagement of the same with the drive nut 24, and at the same time full engagement between the ratchet teeth of the drive nut and either adjacent stop means is effected.

Without the rotatably yielding stop means, it would be very difficult to assemble the parts of the apparatus so as to insure proper driving engagement between the drive nut and the driving stop means, with each successive automatic operation of the apparatus.

Moreover, by thus providing rotatably yielding stop means, the threads of the drive nut 24 and the sleeve 21 are never subject to stripping when the drive nut abuts one of the stop means, and in fact driving load is never imposed on the threads.

I claim:

1. Power transmission apparatus including two rotary members, and a change-speed mechanism operatively associated with the members, the change-speed mechanism including two sets of drive means, each set being operatively interposed between the rotary members, one set of the drive means including a drive member operatively mounted to intermittently engage or disengage the rotary members by changes in the relative speeds of the rotary members, and the other set of drive means including one direction drive means and speed change means operatively interposed between the rotary members, and stop means limiting the period of disengagement between the drive member of the first set of drive means and the rotary members during relative movement between the rotary members.

2. Power transmission apparatus including two rotary members, and a change-speed mechanism operatively associated with the members, the change-speed mechanism including two sets of drive means, each set being operatively interposed between the rotary members, one set of the drive means including a drive member operatively mounted for engaged rotation with and longitudinal movement with respect to one of the rotary members and for simultaneous rotation and longitudinal movement with respect to the other rotary member, longitudinally spaced stop means on one of the rotary members for limiting the longitudinal movement of and engaging the drive member, and the other set of drive means including one direction drive means and speed change means operatively interposed between the rotary members.

3. Power transmission apparatus including two rotary members, and a change-speed mechanism operatively associated with the members, the change-speed mechanism including two sets of drive means, each set being operatively interposed between the rotary members, one set of the drive means including a drive member operatively mounted for engaged rotation with and longitudinal movement with respect to one of the rotary members and for simultaneous rotation and longitudinal movement with respect to the other rotary member, longitudinally spaced shock absorbing stop means on one of the rotary members for limiting the longitudinal movement of and engaging the drive member, and the other set of drive means including one direction drive means and speed change means operatively interposed between the rotary members.

4. Power transmission apparatus including two rotary members, and a change-speed mechanism operatively associated with the members, the change-speed mechanism including two sets of drive means, each set being operatively interposed between the rotary members, one set of the drive means including a drive member in longitudinally slidable engagement with one of the rotary members and in screw thread engagement with means releasably connected with the other rotary member, and the other set of drive means including one direction drive means and speed change means operatively interposed between the rotary members.

5. Power transmission apparatus including two rotary members, and a change-speed mechanism operatively associated with the members, the change-speed mechanism including two sets of drive means, each set being operatively interposed between the rotary members, one set of the drive means including a drive member in longitudinally slidable engagement with one of the rotary members and in screw thread engagement with means releasably connected with the other rotary member, and stop means connected with one of the rotary members for limiting the longitudinal travel of the drive member, and the other set of drive means including one direction drive means and speed change means operatively interposed between the rotary members.

6. Power transmission apparatus including two rotary members, and a change-speed mechanism operatively associated with the members, the change-speed mechanism including two sets of drive means, each set being operatively interposed between the rotary members, one set of the drive means including a screw threaded member connected with one of the rotary members and a drive member in screw thread engagement with the threaded member and in longitudinally slidable engagement with the other rotary member, and the other set of drive means including one direction drive means and speed change means operatively interposed between the rotary members.

7. Power transmission apparatus including two rotary members, and a change-speed mechanism operatively associated with the members, the change-speed mechanism including two sets of drive means, each set being operatively interposed between the rotary members, one set of the drive means including a screw threaded member connected with one of the rotary members and a drive member in screw thread engagement with the threaded member and in longitudinally slidable engagement with the other rotary member, and stop means on the screw threaded member limiting the longitudinal travel of the drive member and providing a driving engagement between the drive member and the threaded member, and the other set of drive means including one direction drive means and speed change means operatively interposed between the rotary members.

8. Power transmission apparatus including a drive shaft, a driven shaft, rotatable means including one direction drive means operatively connecting the shafts to drive the driven shaft at one speed with respect to the drive shaft and with relative rotation occurring between the drive and driven shafts, a drive connecting member, means operatively connecting said member to the drive shaft, and means releasably connecting said member to the driven shaft, whereby a predetermined plurality of revolutions of the drive shaft with respect to the driven shaft when the driven shaft is driven at said one speed causes the drive shaft to move the drive connecting member into engagement with said releasable means and thereby establish another driving connection between the drive and driven shafts to drive the driven shaft at another speed.

9. Power transmission apparatus including a first rotary member, a second rotary member, a drive member operatively mounted for intermittently engaging and disengaging the first and second rotary members, a third rotary member, one direction drive means operatively interposed between the first rotary member and the third rotary member, and a fourth rotary member in engagement with the second rotary member and the third rotary member.

10. Power transmission apparatus including a first rotary member, a second rotary member, a drive member operatively mounted for intermittently engaging and disengaging the first and second rotary members, a third rotary member, one direction drive means and speed change means operatively interposed between the first rotary member and the third rotary member, and a fourth rotary member in engagement with the second rotary member and the third rotary member.

11. Power transmission apparatus including a first rotary member, a second rotary member, a drive member operatively mounted for intermittently engaging and disengaging the first and second rotary members, a third rotary member, one direction drive means operatively interposed between the first rotary member and the third rotary member, and a fourth rotary member operatively mounted for selective engagement with the third rotary member or with the second rotary member and the third rotary member.

12. Power transmission apparatus including a first rotary member, a second rotary member, a drive member operatively mounted for intermittently engaging and disengaging the first and second rotary members, a third rotary member, one direction drive means and speed change means operatively interposed between the first rotary member and the third rotary member, and a fourth rotary member operatively mounted for selective engagement with the third rotary member or with the second rotary member and the third rotary member.

13. Power transmission apparatus including two rotary members, and a change-speed mechanism operatively associated with the members, the change-speed mechanism including two sets of drive means, each set being operatively interposed between the rotary members, one set of the drive means including a drive member operatively mounted for engaged rotation with and longitudinal movement with respect to one of the rotary members and for simultaneous rotation and longitudinal movement with respect to the other rotary member, longitudinally spaced yielding stop means on one of the rotary members for limiting the longitudinal movement of and engaging the drive member, and the other set of drive means including one direction drive means and speed change means operatively interposed between the rotary members.

14. Power transmission apparatus including two rotary members, and a change-speed mechanism operatively associated with the members, the change-speed mechanism including two sets of drive means, each set being operatively interposed between the rotary members, one set of the drive means including a drive member operatively mounted for engaged rotation with and longitudinal movement with respect to one of the rotary members and for simultaneous rotation and longitudinal movement with respect to the other rotary member, longitudinally spaced rotatably yielding stop means on one of the rotary members for limiting the longitudinal movement of and engaging the drive member, and the other set of drive means including one direction drive means and speed change means operatively interposed between the rotary members.

PAUL C. ACKERMAN.